(12) United States Patent
Nazir et al.

(10) Patent No.: US 9,215,891 B2
(45) Date of Patent: Dec. 22, 2015

(54) COMPOSITE MATERIAL (75) Inventors: Mozamal Nazir, Fareham (GB); Eric Pert, Fareham (GB); Kevin Quinlan, Fareham (GB); Richard Taylor, Birmingham (GB)

(73) Assignee: Porvair Filtration Group Limited, Fareham, Hampshire (GB)

( * ) Notice: Subject to any disclaimer, the term of this patent is extended or adjusted under 35 U.S.C. 154(b) by 73 days.

(21) Appl. No.: 13/982,438

(22) PCT Filed: Feb. 1, 2012

(86) PCT No.: PCT/GB2012/050216
§ 371 (c)(1),
(2), (4) Date: Jul. 29, 2013

(87) PCT Pub. No.: WO2012/104637
PCT Pub. Date: Aug. 9, 2012

(65) Prior Publication Data
US 2013/0323383 A1    Dec. 5, 2013

(30) Foreign Application Priority Data
Feb. 3, 2011  (GB) .................................. 1101867.8

(51) Int. Cl.
| | |
|---|---|
| C08K 3/34 | (2006.01) |
| C12H 1/04 | (2006.01) |
| A23L 2/80 | (2006.01) |
| A23L 1/015 | (2006.01) |
| A23L 2/74 | (2006.01) |
| B01D 67/00 | (2006.01) |
| B01D 69/14 | (2006.01) |
| B01D 71/26 | (2006.01) |
| B01D 71/28 | (2006.01) |
| B01D 71/30 | (2006.01) |
| B01D 71/44 | (2006.01) |
| B01J 20/10 | (2006.01) |
| B01J 20/26 | (2006.01) |
| B01J 20/28 | (2006.01) |
| C12H 1/056 | (2006.01) |
| B01D 39/16 | (2006.01) |
| B01D 71/76 | (2006.01) |
| B01D 71/02 | (2006.01) |

(52) U.S. Cl.
CPC .................. *A23L 2/80* (2013.01); *A23L 1/0156* (2013.01); *A23L 2/74* (2013.01); *B01D 39/16* (2013.01); *B01D 67/0004* (2013.01); *B01D 67/0079* (2013.01); *B01D 69/147* (2013.01); *B01D 69/148* (2013.01); *B01D 71/26* (2013.01); *B01D 71/28* (2013.01); *B01D 71/30* (2013.01); *B01D 71/44* (2013.01); *B01D 71/76* (2013.01); *B01J 20/103* (2013.01); *B01J 20/261* (2013.01); *B01J 20/267* (2013.01); *B01J 20/28026* (2013.01); *B01J 20/28033* (2013.01); *C12H 1/0424* (2013.01); *B01D 71/027* (2013.01); *B01D 2239/0407* (2013.01); *B01D 2323/40* (2013.01); *B01D 2325/24* (2013.01); *B01J 2220/445* (2013.01); *B01J 2220/46* (2013.01)

(58) Field of Classification Search
USPC ........................................................ 524/493
See application file for complete search history.

(56) References Cited

U.S. PATENT DOCUMENTS

| | | | |
|---|---|---|---|
| 4,156,025 | A | 5/1979 | Dalgleish |
| 4,798,847 | A | 1/1989 | Roesink et al. |
| 5,456,843 | A | 10/1995 | Koenhen |
| 5,484,620 | A | 1/1996 | Oechsle et al. |
| 5,866,660 | A | 2/1999 | Kabanov et al. |
| 6,001,406 | A | 12/1999 | Katzke et al. |
| 6,391,994 | B2 | 5/2002 | Tomihisa et al. |
| 7,172,075 | B1 | 2/2007 | Ji |
| 7,767,125 | B2 | 8/2010 | Mathauer et al. |
| 2003/0044498 | A1 | 3/2003 | Rehmanji et al. |
| 2003/0124233 | A1 | 7/2003 | Gomez et al. |
| 2004/0094486 | A1* | 5/2004 | Drohmann et al. ........... 210/777 |
| 2008/0113071 | A1 | 5/2008 | Cohen |
| 2008/0146741 | A1 | 6/2008 | Mathauer et al. |
| 2008/0169234 | A1* | 7/2008 | Diemer et al. ................ 210/345 |
| 2010/0021601 | A1 | 1/2010 | Earl et al. |

FOREIGN PATENT DOCUMENTS

| | | |
|---|---|---|
| EP | 1533015 A1 | 5/2005 |
| EP | 2022555 A1 | 2/2009 |
| JP | 64-010976 | 1/1989 |
| JP | 2008-284471 A | 11/2008 |

(Continued)

OTHER PUBLICATIONS

Leiper et al., Journal of Institute of Brewing, 118-127, Jan. 1, 2005.*

(Continued)

*Primary Examiner* — Hui Chin
(74) *Attorney, Agent, or Firm* — Marshall, Gerstein & Borun LLP (57) ABSTRACT

A porous formed composite material comprising: (i) a polymer, or a mixture thereof, said polymer having immobilised therein (ii) an insoluble sorbent material selected from the group consisting of: (a) a cross-linked vinyl lactam homopolymer or copolymer, said vinyl lactam homopolymer or copolymer being optionally mixed with silica gel; and (b) polyvinyl lactam-modified silica gel; is described. Solid phase extraction apparatus incorporating the material and its use in removing polyphenols and/or proteins from beverages to prevent the formation of haze in beverages are also described.

20 Claims, 8 Drawing Sheets

(56) References Cited

FOREIGN PATENT DOCUMENTS

| WO | WO-02/34375 A1 | 5/2002 |
| WO | WO-2007/017112 A1 | 2/2007 |

OTHER PUBLICATIONS

Bezwoda et al., "Iron absorption from red and white wines," *Scand J. Haematol*, 34:121-127 (1985).

Chapon, "The Mechanics of Beer Stabilisation," *Brewer's Guardian* 123, pp. 46-50 (1994).

Rehmanji et al., "A Novel Sabilization of Beer with Polyclar Brewbite," *MBAA TQ* 39(1), pp. 24-28 (2002).

Leiper et al., "Optimising Beer Stabilisation by the Selective Removal of Tannoids and Sensitive Proteins," Journal of Institute of Brewing, pp. 118-127 (Jan. 1, 2005).

International Search Report in PCT/GB2012/050216 dated Jul. 3, 2012.

Written Opinion in PCT/GB2012/050216 dated Jul. 16, 2012.

International Preliminary Report on Patentability and Written Opinion of the International Searching Authority in International Application No. PCT/GB2012/050216, dated Aug. 6, 2013 (12 pgs.).

\* cited by examiner

COMPOSITE MATERIAL

FIELD OF THE INVENTION

This invention relates to composite materials. It also relates to methods for their preparation and their use in preventing the formation of haze in beverages, particularly alcoholic beverages, by removing polyphenols and/or polypeptides therefrom.

BACKGROUND TO THE INVENTION

A polyphenol is a chemical compound characterized by the presence of more than one phenol unit or building block per molecule, i.e. an alcohol containing two or more benzene rings that each has at least one hydroxyl group (OH) attached. Polyphenols are generally divided into hydrolyzable tannins (gallic acid esters of glucose and other sugars) and phenylpropanoids, such as lignins, flavonoids, and condensed tannins.

As described in K. A. Leiper et al., *J. Inst. Brew.* 2005, 111(2), 118-127, colloidal instability in beer is caused mainly by interactions between polypeptides and polyphenols. These combine to produce a visible haze following storage, particularly if there is oxygen in the beer as this causes the polyphenols to oxidise resulting them becoming more haze active as their affinity for haze active proteins increases. Haze is not only visually unappealing but detrimental to the taste of the beer and reduces the beer's shelf life. Reducing the levels of one or both of polypeptides and polyphenols using suitable stabilising treatments will extend physical stability.

Polypeptides responsible for haze formation in beer originate mainly from barley, range in size from 10 kD to 30 kD and are rich in the amino acids proline and glutamic acid. They are heavily glycosylated with glucose and account for only 3-7% of total beer protein.

Polyphenols in beer originate from barley and hops. Beer contains approximately 100-300 mg/L polyphenol and these can be divided into derivatives of hydrobenzoic and hydroxycinnamic acids and flavanols and their derivatives. The latter group account for 10% of total beer polyphenols and contain species related to colloidal instability. Tannoids are polyphenols that are oxidised to form tannins, and these are known to combine with the molecule polyvinylpyrrolidone (PVP) to cause haze.

Flavanoids (oligomers of flavanols) all have the same basic structure of two aromatic rings linked by a three carbon unit and they are often hydroxylated to varying degrees and these groups are sometimes glycosylated or methylated. Flavanols found in beer are catechin, epicatechin, gallocatechin and epigallocatechin. These can exist as monomers but are more commonly joined to form flavanoids as dimers, trimers or larger polymers.

Prior methods for removing haze-active proteins involved the use of non-selective enzymes: these would remove most of the protein from the beer, resulting in beer that did not foam. Agents were then added to the beer to allow it to foam. More recently enzymes that target proline rich proteins have become available. The most successful of these is Clarex™, a product available from DSM Food Specialties. The enzymes are safe and do not prevent the formation of foam.

The addition of tannins to beer that form complexes with proteins in beer is a well established technique. The tannins are comprised of oxidised tannoids and therefore readily form an insoluble precipitate (haze) that can be filtered from the beer.

However both the tannin and enzyme dosage methods have a major drawback; because they are soluble in beer they may fail to comply with legislation regarding additives in beer. In addition, there is considerable consumer pressure in Europe to remove additives from beer and other beverages. It would therefore be desirable to devise a method of preventing haze in beverages without using soluble adsorbents.

Stabilisation of beer using insoluble adsorbents that are insoluble and selective for haze active proteins has resulted in only one feasible solution: silica gel. The silica gels used in beer stabilisation have a very high surface area and numerous selective binding sites for haze active proteins. They are highly effective. Silica gels are widely available as both hydrated and non-hydrated products. The hydrated products are easier to handle as powders, the non-hydrated gels are more effective. The key drawback of using silica gels is that they are not practically regenerable in a brewery.

Polyvinylpolypyrrolidone (also known as PVPP, cross-linked polyvinyl pyrrolidone, crospovidone or crospolividone) is an insoluble, highly cross-linked form of polyvinyl pyrrolidone (PVP). PVPP compositions are commercially available: examples of commercial compositions include the range of PVPP products sold by ISP Corporation as Polyclar®.

The use of polyvinylpolypyrrolidone to remove polyphenols in beer production and thereby stabilise the beer is known in the art. Prior art PVPP formulations are typically in powder or agglomerate form. For example, U.S. Pat. No. 5,484,620 describes polymer blends including PVPP and polyethylene, and their potential use in filtering or clarifying beer to adsorb haze-causing impurities such as polyphenols. The polymers may be sintered together to form an agglomerate.

U.S. Pat. No. 7,767,125 describes a polymer blend comprised of polystyrene and water-insoluble cross-linked PVP. These polymer blends are stated to be suitable as filter aids for filtering alcoholic beverages, such as wine or beer, and non-alcoholic beverages, such as fruit juice. The polymers are blended and the mixture extruded and pelletized.

However, a number of disadvantages are associated with the use of the known powder, pellet and agglomerate formulations. In particular, there are a number of safety risks (in particular relating to inhalation) associated with the handling of loose powder formulations. The powder formulations also readily form a cake on wetting: this can cause fouling of the beverage stream being passed through it and takes more time and effort to remove and replace in preparation for the next batch.

M. Rehmanji et al., *MBAA TQ,* 2002, 39(1), 24-28, describes stabilisation of beer with a composite of micronised PVPP and carrageenan (Polyclar® Brewbrite™). The product is stated to reduce the level of the haze active tannoid fraction.

The addition of (non-cross-linked) PVP to membranes, such that the PVP acts as wetting agent, is known in the art. However, membranes manufactured from materials such as polyethersulfone and poly(vinylidene fluoride) are too hydrophobic to be used effectively for filtering beverages without the incorporation of wetting agents. These wetting agents can leach into the product and there are therefore limits on the amount that can be used.

U.S. Pat. No. 7,172,075 describes a method for manufacturing such a membrane; this membrane includes a barrier layer which contains PVPP immobilised in a polymer matrix. In this membrane application, the PVPP is part of the membrane's formulation in order to give it the appropriate physical properties, namely to increase porosity. However, the membrane formulation contains insufficient PVPP to enable it to act as a sorbent material for large scale beverage stabilisation applications: the total mass of PVPP present in the membrane would only provide a dose of a few milligrams per hectolitre of beverage in use. Consequently, if used in large scale beverage stabilisation applications, the PVPP would be rapidly exhausted after a few litres of beverage had passed through and the membrane subsequently incapable of removing further polyphenols.

U.S. Pat. No. 4,798,847 describes the preparation of hydrophobic membranes including a hydrophobic polymer and a hydrophilic polymer in a suitable solvent medium. The hydrophilic polymer may be polyvinyl pyrrolidone, which may be cross-linked. However, in this publication the polyvinyl pyrrolidone chains are cross-linked to the substrate, rather than to themselves. Moreover, the hydrophobic polymer used for the membranes in this publication is polyether sulfone or polyether imide: these polymers are expensive to produce and therefore impractical for large-scale beverage stabilisation applications. In addition, the small total mass of PVPP present in the membrane would also be rapidly exhausted after a few litres of beverage had passed through and the membrane subsequently incapable of removing further polyphenols, thus making such membranes unsuitable for large scale beverage stabilisation applications.

WO 02/34375 describes composite filters and methods for preparing them. However, these do not use PVPP: instead, these use non-cross-linked PVP as a wetting agent.

US 2008/0169234 describes a roll type product that is comprised of cellulose filter sheet media. However, the material used to form this product is generally elastic. Elasticity is disfavoured for filtration materials for beverage applications, as using such materials would cause a rise in the pressure drop during use. A high pressure drop requires much greater energy costs to achieve flow, and limits the application of the method to high pressure vessels and ancillary equipment.

SUMMARY OF THE INVENTION

The invention comprises in one aspect a porous formed composite material comprising:
(i) a polymer, or a mixture thereof, said polymer having immobilised therein:
(ii) an insoluble sorbent material selected from the group consisting of:
  (a) a cross-linked vinyl lactam homopolymer or copolymer, said vinyl lactam homopolymer or copolymer being optionally mixed with silica gel; and
  (b) polyvinyl lactam-modified silica gel.

The invention comprises in another aspect a porous formed composite material comprising:
(i) a polymer, or a mixture thereof, and:
(ii) an insoluble sorbent material selected from the group consisting of:
  (a) a cross-linked vinyl lactam homopolymer or copolymer, said vinyl lactam homopolymer or copolymer being optionally mixed with silica gel; and
  (b) polyvinyl lactam-modified silica gel;
the formation process causing the polymer (i) and insoluble sorbent material (ii) to be formed into a unitary body such that the insoluble sorbent material is immobilised into the structure of the unitary body.

The invention comprises in a further aspect a solid phase extraction apparatus comprising the above porous formed composite material.

The invention comprises in a yet further aspect a method of manufacturing the above porous formed composite material comprising mixing the polymer and the sorbent material and forming the mixture into the required form.

The invention comprises in a still further aspect a method of preventing the formation of haze in a beverage, the method comprising passing the beverage through the above porous formed composite material or the solid phase extraction apparatus comprising it.

The invention comprises in a yet further aspect a method of reducing the levels of a polyphenol, a polypeptide and/or a protein in a beverage, the method comprising passing the beverage through the above porous formed composite material or the solid phase extraction apparatus comprising it.

The invention comprises in a still further aspect a method of removing a substance selected from a polyphenol, a polypeptide and a protein from a beverage, the method comprising passing the beverage through a porous formed composite material comprising:
(i) a polymer, or a mixture thereof, said polymer having immobilised therein:
(ii) an insoluble sorbent material selected from the group consisting of:
  (a) a cross-linked vinyl lactam homopolymer or copolymer, said vinyl lactam homopolymer or copolymer being optionally mixed with silica gel;
  (b) polyvinyl lactam-modified silica gel; and
  (c) silica gel.

The invention comprises in a yet further aspect a method of preventing the formation of haze in a beverage, the method comprising passing the beverage through a porous formed composite material comprising:
(i) a polymer, or a mixture thereof, said polymer having immobilised therein:
(ii) an insoluble sorbent material selected from the group consisting of:
  (a) a cross-linked vinyl lactam homopolymer or copolymer, said vinyl lactam homopolymer or copolymer being optionally mixed with silica gel;
  (b) polyvinyl lactam-modified silica gel; and
  (c) silica gel.

The invention comprises in a yet further aspect a method of removing a metal ion from a solution, the method comprising passing the solution through a porous formed composite material comprising:
(i) a polymer, or a mixture thereof, said polymer having immobilised therein:
(ii) an insoluble sorbent material selected from the group consisting of:
  (a) a cross-linked vinyl lactam homopolymer or copolymer, said vinyl lactam homopolymer or copolymer being optionally mixed with silica gel;
  (b) polyvinyl lactam-modified silica gel; and
  (c) silica gel.

DETAILED DESCRIPTION OF PREFERRED EMBODIMENTS

The invention comprises a porous formed composite material comprising a polymer having a sorbent material immobilised therein. The choice of polymer is not critical provided it is sufficiently porous to allow the beverage to pass through it and is capable of immobilising the sorbent material within its structure.

Suitably, the polymer is an organic polymer. In one embodiment, the polymer is a thermoplastic organic polymer. Suitable thermoplastic organic polymers that can be used in the present invention include, but are not limited to, polyolefins, polyether ether ketones (PEEK), poly(ether sulfones), polyamides (nylons), polyesters, polycarbonates, polyimides, polyurethanes and mixtures thereof.

Examples of suitable polyolefins include, but are not limited to: polyethylenes; polypropylenes; poly(1-butene); poly(methyl pentene); poly(2-pentene), poly(3-methyl-1-pentene), poly(4-methyl-1-pentene), 1,2-poly-1,3-butadiene, 1,4-poly-1,3-butadiene, polyisoprene, polychloroprene, poly(vinyl chloride); poly(acrylonitrile); poly(vinylidene fluoride); poly(tetrafluoroethylene) (Teflon®), poly(vinyl acetate); polystyrene; poly(methyl methacrylate); ethylene-vinyl acetate copolymer; ethylene methyl acrylate copolymer; styrene-acrylonitrile copolymers; ethylene-propylene-diene, acrylonitrile-butadiene-styrene, cycloolefin polymers and copolymers; and mixtures and derivatives thereof.

In one embodiment, the polymer material is not a polysulfone. In one embodiment, the polymer material is not a polyether sulfone. In one embodiment, the polymer material is not a polyether imide.

In one embodiment, the polymer material is not cellulose or a cellulose ether or ester.

In one embodiment, the polymer material is not poly(vinylidene fluoride). In one embodiment, the polymer material is not poly(vinylidene fluoride-co-hexafluoropropylene). In one embodiment, the polymer material is not poly(acrylonitrile-co-methacrylonitrile). In one embodiment, the polymer material is not poly(vinyl butyral-co-vinyl alcohol-vinyl acetate).

In one embodiment, the polymer material is polyethylene or polypropylene, preferably polyethylene. A particularly suitable polymer material is the range of materials sold as Vyon® by Porvair Filtration Group Ltd.

Polyethylene is typically characterised by its density and linearity. Very low density polyethylene (VLDPE), low density polyethylene (LDPE), linear low density polyethylene (LLDPE), medium density polyethylene (MDPE) and high density polyethylene (HDPE) and ultra high molecular weight polyethylene (UHMWPE) may all be used in the present invention. UHMWPE is polyethylene with a molecular weight numbering in the millions, usually between 3.1 and 5.67 million. It typically has a density of 0.930-0.935 g/cm$^3$. HDPE is defined by a density of greater or equal to 0.941 g/cm$^3$. MDPE is defined by a density range of 0.926-0.940 g/cm$^3$. LLDPE is defined by a density range of 0.915-0.925 g/cm$^3$. LLDPE is a substantially linear polymer with significant numbers of short branches, commonly made by copolymerization of ethylene with short-chain alpha-olefins (for example, 1-butene, 1-hexene and 1-octene). LDPE is defined by a density range of 0.910-0.940 g/cm$^3$. VLDPE is defined by a density range of 0.880-0.915 g/cm$^3$. VLDPE is a substantially linear polymer with high levels of short-chain branches, commonly made by copolymerization of ethylene with short-chain alpha-olefins (for example, 1-butene, 1-hexene and 1-octene).

Examples of suitable polyamides include nylon 6-6, nylon 6-12 and nylon 6. Examples of suitable polyesters include polyethylene terephthalate, polybutylene terephthalate, polytrimethylene terephthalate, polyethylene adipate, polycaprolactone, and polylactic acid.

The porous formed composite polymer material of the present invention includes a sorbent material immobilised therein. The sorbent material is a material capable of reducing the levels of haze-forming polyphenols, polypeptides and/or proteins from a beverage (particularly an alcoholic beverage such as beer or wine, a fruit juice or a vinegar) in order to prevent the formation of haze in the beverage.

In one embodiment, the sorbent material comprises a cross-linked vinyl lactam homopolymer or copolymer. The vinyl lactam polymers used in the composite materials of the present invention have a repeating unit of the following general formula:

wherein n is 0 to 6.

In the above general formula, preferably n is 1, 2 or 3, more preferably 1 or 3, most preferably 1. When n is 1, the repeating unit is a vinyl pyrrolidone repeating unit. When n is 3, the repeating unit is a vinyl caprolactam repeating unit. The vinyl lactam repeating units may be the same or different.

In one embodiment, the cross-linked vinyl lactam polymer is a homopolymer (ie it contains only one type of vinyl lactam repeating unit). Examples of such cross-linked vinyl lactam homopolymers include polyvinyl polypyrrolidone (PVPP) and cross-linked polyvinyl caprolactam.

In another embodiment, the cross-linked vinyl lactam polymer is a copolymer including one or more other vinyl repeating unit in addition to the vinyl lactam repeating unit. The other repeating unit may be another vinyl lactam repeating unit, such as those described and exemplified above. Alternatively, the other repeating unit may be a vinyl repeating unit, examples of which include ethylene; propylene; 1-butene; 2-methylpentene; acrylonitrile; vinyl acetate; styrene; vinyl imidazole; methacrylic acid; alkyl methacrylate; and mixtures thereof. A particular example of a copolymer is the cross-linked copolymer of vinyl pyrrolidone and vinyl imidazole sole as Divergan® HM by BASF.

When the organic polymer is a copolymer containing a vinyl pyrrolidone repeating unit, the copolymer typically contains at least 10%, in some embodiments at least 50%, vinyl pyrrolidone repeating units (as a percentage of the total number of repeating units in the copolymer).

The vinyl lactam polymer used in an embodiment of the present invention is cross-linked. In one embodiment, the term "cross-linked" means that the poly(vinyl lactam) polymer chains are predominantly cross-linked to one another, rather than to the polymer substrate. In one embodiment, the term "cross-linked" means that more than 50% of the poly (vinyl lactam) polymer chains are cross-linked to one another and less than 50% to the polymer substrate.

In one embodiment, the term "cross-linked" means that more than 70% of the poly(vinyl lactam) polymer chains are cross-linked to one another and less than 30% to the polymer substrate. In one embodiment, the term "cross-linked" means that more than 90% of the poly(vinyl lactam) polymer chains are cross-linked to one another and less than 10% to the polymer substrate. In one embodiment, the term "cross-linked" means that more than 95% of the poly(vinyl lactam) polymer chains are cross-linked to one another and less than 5% to the polymer substrate.

The degree of cross-linking of vinyl lactam homopolymers or copolymers is difficult to measure directly owing to the insolubility of these polymers. However, a number of methods are used in the art to estimate the degree of cross-linking.

In one embodiment, the vinyl lactam homopolymer or copolymer is cross-linked to a degree such that between 50% and 100%, preferably between 60% and 100% of the polymer is insoluble. In this context the term "insoluble" means a maximum of 1.5% by weight of the vinyl lactam homopolymer or copolymer product dissolves in a solvent selected from water, acetic acid or ethanol or a mixture of any thereof. When the vinyl lactam homopolymer or copolymer is PVPP, preferably the degree of cross-linking of the PVPP is such that between 60% and 100% of the PVPP is insoluble.

In one embodiment, the vinyl lactam homopolymer or copolymer is typically cross-linked to a degree such that it is insoluble in the beverage from which the haze-forming substances (typically polyphenols, polypeptides and/or proteins) are to be removed.

The degree of cross-linking may also be estimated by measuring the amount of unreacted vinyl lactam monomer. Therefore, in one embodiment, the vinyl lactam homopolymer or copolymer is cross-linked to a degree such that a maximum of 10 ppm polyvinyl lactam monomer is present in the final product.

The degree of cross-linking may also be estimated by measuring the amount of unreacted cross-linking agent. Therefore, in one embodiment, the vinyl lactam homopolymer or copolymer is cross-linked to a degree such that a maximum of 2 ppm of the cross-linker (whether added or formed in situ) is present in the final product. Examples of cross-linking agents typically used in vinyl lactam polymers include N,N'-divinylpimidazolidone, N,N'-divinylethyleneurea, N,N'-divinylpropylurea, alkylenebisacrylamides and alkylene glycol di(meth)acrylates.

The degree of cross-linking may also be estimated by measuring the amount of swelling of the polymer. Therefore, in one embodiment, the vinyl lactam homopolymer or copolymer is cross-linked to a degree such that it swells in water to a maximum of 15 L/kg, preferably a maximum of 10 L/kg.

In one embodiment, the sorbent material comprises polyvinylpolypyrrolidone (also known as cross-linked polyvinyl pyrrolidone, PVPP, crospovidone or crospolividone). PVPP is a highly cross-linked modification of polyvinylpyrrolidone (PVP). In the present invention, the PVPP is typically cross-linked to a degree such that it is insoluble in the beverage from which the haze-forming substances (typically polyphenols, polypeptides and/or proteins) are removed.

As is known in the art, polyvinylpolypyrrolidone may be produced by popcorn polymerisation. This process involves the heating of the monomer N-vinyl pyrrolidone in the presence of an alkali (in particular an alkali metal hydroxide) in order to form cross-linking agents (usually bifunctional monomers) in situ. Alternatively, a cross-linking agent may be present as an initial component of the mixture. Further additives may be added at various stages of the polymerisation in order to enhance the capabilities of the polymer. For example, hydrogen peroxide may be added to increase the tannoid reducing ability of the polymer. The final composite is insoluble (as defined above) and can be washed to remove impurities such as unreacted monomer.

A particularly preferred PVPP used in the present invention is Polyclar® 10, which is a homopolymer produced by popcorn polymerisation of 1-vinyl 2-pyrrolidone. This is commercially available from International Speciality Products (ISP) and has a mean particle size of 25 µm and a glass transition temperature of 183° C. Its use in the regenerable porous formed composite materials of the present invention enables a lower cost, smaller particle size and higher surface area PVPP to be used.

In another embodiment, the sorbent material comprises polyvinyl lactam-modified silica gel. In this material, the polyvinyl lactam is chemically bonded to the surface of the silica gel. Preferably, the polyvinyl lactam-modified silica gel is polyvinyl pyrrolidone-modified silica gel. Typically, the polyvinyl pyrrolidone-modified silica gel comprises between 2 and 20% by weight, preferably 4 to 8%, polyvinyl pyrrolidone. An example of a polyvinyl pyrrolidone-modified silica gel product is that available as Lucilite® TR from PQ Corporation.

In another embodiment, the sorbent material is a mixture of silica gel and PVPP. In this material, the silica gel and PVPP are both present in the composite material but form discrete particles in the material rather than being bonded together. In this embodiment, the PVPP is typically cross-linked to a degree such that it is insoluble in the beverage from which the haze-forming substances (typically polyphenols, polypeptides and/or proteins) are removed. Typically the mixture contains from 0.25% to 31.5% by weight of silica gel and 31.5% to 0.2% by weight of polyvinylpolypyrrolidone (the percentages being of the total weight of the porous formed composite material).

In order to produce the porous formed composite material of the invention, the polymer and the sorbent material are mixed and the mixture formed into the desired shape. In contrast to the prior art powder formulations, the formation process causes the mixture of materials to be formed into a unitary body such that the sorbent material is immobilised into the structure of the unitary body. Suitable shapes into which the composite material may be formed include a frit, a sheet, a tube, a disc or a roll.

In one embodiment, the composite material may be formed into a hollow cylindrical or prismatic shape. A filtration or solid phase extraction apparatus may be formed from multiple, typically concentric, cylindrical or prismatic shapes. These can be surrounded by an outer housing, the form of which is not particularly limited provided it is not wholly impervious to the solution from which filtration or extraction is desired. Individual modules of the compound can be joined according to a number of methods well known to those skilled in the art.

In another embodiment, the composite material may be formed into a flat sheet. The sheets may take any suitable shape, including circular, ovoid or polygonal. These sheets may be stacked one on top of another and/or joined together to form a lenticular type construction. It is particularly preferred that the material is cut into shapes such as hexagons which are able to interlock and be stacked in a lenticular format. The joining process can be carried out by a number of methods well known to those skilled in the art, such as welding, gluing or solvent bonding. Further configurations can be manufactured by three-dimensional moulding to form pre-stacked identical sheets of the composite material.

In one embodiment, the composite material may be formed from alternate layers of the polymer and the insoluble sorbent material. The layers may be fixed together. Alternatively, successive layers may be held together separately by a device in order to immobilise the insoluble sorbent material.

The mixture may be formed into the desired shape by a number of processes known in the art, such as moulding, sintering and rolling. The material can be easily formed into various shapes in a range of sizes to fit existing and novel process equipment. In particular, the material may be retrofitted to filter sheet systems such as plate and frame filters. This is of particular value for stabilising wines.

Alternatively, the material of the present invention may be used in a cross-flow format, in which the composite could be formed into a welded tube or as a flat disc. The material may also be used as a laminate with filtration media.

Typically, the mixture of polymer and sorbent material are formed into the desired shape by sintering the materials by heating to allow the polymer to fuse. Typically, the mixture is sintered at a temperature of 100 to 400° C., preferably 180 to 260° C. Typically, the mixture is sintered for a time of 3 to 40 minutes, preferably 6 to 20 minutes.

In contrast to the powder and agglomerate formulations known in the prior art, the forming of the polymer/sorbent mixture into a shape (such as a sheet, disc, frit or roll) enables the sorbent to be immobilised within the polymer matrix. This also allows the sorbent material to be more evenly distributed throughout the polymer matrix and ensures better contact between the sorbent particles and the beverage passing through it. The forming of the mixture into shapes such as discs or frits allows these to be replaced more rapidly than the prior art powder formulations and therefore lessen the time taken between batches.

In addition, the forming of the polymer/sorbent mixture into a unitary body (such as a sheet, disc, frit or roll) reduces eliminates the risk of the sorbent material being accidentally dosed into the beverage. The use of the prior art powder formulations frequently resulted in the sorbent material escaping into the beer stream following damage to the filter cake, thereby requiring the presence of guard filters. Forming the polymer/sorbent mixture into a unitary body potentially allows such guard filters to be eliminated or their usage drastically reduced.

The forming of the polymer/sorbent mixture into a unitary body in which the sorbent is fixed within the matrix permits easier regeneration of the sorbent with strong alkali such as sodium hydroxide, particularly when the sorbent material is PVPP. As less alkali is required, regeneration is therefore safer and more environmentally friendly. The regenerated material also exhibits a reduced loss of stabilisation effect following regeneration: there is no requirement to top-up, in order to make up for lost sorbent material.

The forming of the polymer/sorbent mixture into a composite, rigid unitary body enables higher pressure drops (and therefore flow) across the composite material because the matrix is rigid: the material also does not display hysteresis characteristics for pressure vs. flow relationship. There is also no requirement to handle loose powder, thereby minimising potential health and safety risks to operators, loss of material, and improving the cleanliness of the material.

The formed composite material is also easy to install, with little skill required to initiate the process, in contrast to the formation of powder beds of the sorbent material. Forming the material into a unitary body also enables more rapid replacement of composite saving downtime between batches, compared with forming a cake bed or filling a dosing tank with sorbent material.

The degree of stabilisation required can easily be altered by changing the flow rate to increase or decrease the contact time between the sorbent material and the beverage, or by increasing the depth of matrix (for example, by stacking multiple discs of composite to increase the contact time and thereby the stabilisation effect).

The forming of the polymer/sorbent mixture into a unitary body in which the sorbent is fixed within the matrix permits accurate and reproducible stabilisation: the polymer matrix and adsorbent can be manufactured precisely. When the sorbent material is a mixture of PVPP and silica, it is easy to combine the silica gel and PVPP in varying ratios to best optimise the stabilisation process.

The material and method of the present invention exhibits reduced loss of the beverage in comparison to existing methods due to minimal retention of the beverage within the polymer matrix at the end of the stabilisation process. It is also easier to switch between products because less beer and regeneration chemical is retained in the matrix. Oxygen entrainment may also be reduced by using deoxygenated water to wet the composite.

When the sorbent material is a mixture of PVPP and silica, the formation of the polymer/sorbent material mixture into a formed, unitary body enables the use of very fine PVPP/silica powders with high surface area to volume ratios resulting in less adsorbent being required. Fine PVPP/silica powders can not be used in leaf filters or candles without diatomaceous earth due to a high pressure drop.

Preferably, the porous formed composite material of the invention contains 0.5% to 60%, more preferably 1 to 50%, even more preferably 2 to 38%, still more preferably 3 to 25%, yet more preferably 5 to 20% by weight, and most preferably 7 to 20% by weight (based on the total weight of the composition) of the sorbent material.

When the sorbent material is polyvinyl polypyrrolidone, the porous formed composite polymer of the invention contains 2% to 38% by weight, more preferably 2.5% to 35%, still more preferably 3 to 25%, yet more preferably 5 to 20% by weight, and most preferably 7 to 20% by weight (based on the total weight of the composition) of polyvinyl polypyrrolidone.

When the sorbent material is polyvinyl pyrrolidone-modified silica gel, the porous composite polymer of the invention preferably contains 2% to 38% by weight, more preferably 2.5% to 35%, still more preferably 3 to 25%, and most preferably 5 to 20% by weight (based on the total weight of the composition) of the polyvinyl pyrrolidone-modified silica gel.

In a particularly preferred embodiment, the polymer is polyethylene and the sorbent material is polyvinyl polypyrrolidone. In this embodiment, the porous formed composite material of the invention contains 98% to 62% by weight, more preferably 97.5% to 65%, still more preferably 97 to 75%, and most preferably 95 to 80% by weight (based on the total weight of the composition) of polyethylene and 2% to 38% by weight, more preferably 2.5% to 35%, still more preferably 3 to 25%, and most preferably 5 to 20% by weight (based on the total weight of the composition) of polyvinyl polypyrrolidone.

In one embodiment, the porous formed composite material of the invention is modified by addition of a non-cross-linked vinyl lactam polymer, which is then cross-linked to the porous material. The cross-linking of the non-cross-linked vinyl lactam polymer to the porous material may be carried out either prior to sintering or after sintering. This creates a composite with a higher specific flow rate and adsorption capacity than the composite material that can be shaped into a variety of forms. The particle can be regenerated and does not leach the poly(vinyl lactam) into the beverage. In this embodiment, the non-cross-linked vinyl lactam polymer may be polyvinyl pyrrolidone or polyvinyl caprolactam, preferably polyvinyl pyrrolidone.

The invention also comprises a solid phase extraction apparatus comprising the porous formed composite polymer of the invention. Solid phase extraction apparatus may take a number of forms well known to those skilled in the art. Typical forms include cartridges, columns and fixed bed apparatus.

The porous formed composite material of the invention is used for stabilising beverages by preventing the formation of haze in the beverages, particularly by reducing the levels of polyphenols, polypeptides and/or proteins from the beverage. In this specification the term "polyphenol" means a compound containing two or more benzene rings that each has at least one hydroxyl group attached. The polyphenols may be any polyphenols typically present in beverages, in particular tannins, tannoids and flavonoids.

In one embodiment, the porous formed composite material of the invention may be used for stabilising beverages by reducing the levels of tannoids, which are the polyphenols mainly responsible for causing haze. In this specification the term "tannoid" means a polyphenol (as defined above) that precipitates from aqueous solution upon the addition of polyvinyl-pyrrolidone (PVP), as described in L. Chapon, *Brewers' Guardian*, December 1994, 46-50. The reduction in tannoids is one indication of the level of stabilisation. A reduction in the tannoid content results in a more stable product that has a lower haze value following storage for extended periods. Tannoid levels can measured by titration (level of haze is measured) with PVP solution. This can be done manually or using a tannometer (e.g. Pfeuffer GmbH Tannometer).

In one embodiment, the beverage is an alcoholic beverage. Examples of alcoholic beverages in which hazing may be prevented using the materials and methods of the invention include beer, wine, cider, whisky, gin, rum, tequila, brandy and vodka. Particularly preferred examples include beer and wine, especially white wine.

In one embodiment, the beverage is a fruit juice. Non-limiting examples of fruit juices in which hazing may be prevented using the materials and methods of the invention include apple juice, orange juice, pineapple juice, peach juice, pear juice and cranberry juice.

In one embodiment, the beverage is a vinegar, typically although not exclusively a vinegar produced from an alcoholic beverage. Examples of vinegars in which hazing may be prevented using the materials and methods of the invention include malt vinegar, wine vinegar and cider vinegar.

The dosage of the insoluble sorbent material varies depending on the nature of the sorbent material and the beverage passing through it. In one embodiment, the porous formed composite polymer of the invention is formulated such that, in use, a dosage of the insoluble sorbent material of between 2-200 g/hl of the beverage, preferably 10-100 g/hl beverage is provided. In contrast to the prior art membranes (which typically provide only a few mg/hl of the beverage in use and would rapidly be exhausted when even small amounts of polyphenol-containing beverage passed through them), the formulation of the composite material of the invention provides dosage which is capable of removing the majority, preferably substantially all, of the polyphenols, from beverages at the hectolitre scale and upwards.

When the sorbent material is polyvinyl polypyrrolidone and the beverage is beer, the porous formed composite polymer of the invention is formulated such that, in use, a dosage of PVPP of between 2-200 g/hl beer, preferably 10-100 g/hl beer is provided.

In another embodiment, the porous formed composite material of the invention may be used to remove metal ions from a solution, especially a beverage. Metal ions can be present in both the beverage and as a contaminant from process waters for cleaning. Borehole water in particular can have high concentrations of metal ions. The potential health problems associated with high levels of metal ions in a product, especially foods and beverages, are well known in the art. In addition, metal ions are known to combine with polyphenols to accelerate the process of haze formation. The use of PVPP and PVP to remove iron ions from beverages such as wine is known generally in the art: see W. R. Bezwoda et al. *Scand. J. Haematol.* 1985, 34(2), 121-127.

Therefore, the invention comprises in a yet further aspect a method of removing a metal ion from a solution, especially a beverage, the method comprising passing the solution through a porous formed composite material of the present invention. The metal ion may be any metal ion, examples of which include alkali metals such as lithium, sodium, potassium, rubidium and caesium; alkaline earth metals such as beryllium, magnesium, calcium, strontium and barium; transition metals such as zinc, molybdenum, cadmium, scandium, titanium, vanadium, chromium, manganese, iron, cobalt, nickel, copper, yttrium, zirconium, niobium, technetium, ruthenium, rhodium, palladium, silver, hafnium, tantalum, tungsten, rhenium, osmium, iridium, platinum and gold; lanthanoids such as lanthanum, cerium, praseodymium, neodymium, promethium, samarium, europium, gadolinium, terbium, dysprosium, holmium, erbium, thulium, ytterbium and lutetium; actinides such as thorium, uranium, neptunium and plutonium; and p-block metals such as aluminium, gallium, indium, tin, thallium, lead and bismuth.

In one embodiment, the metal ion is a transition metal ion, especially iron, copper or manganese. In one particularly preferred embodiment, the metal ion is an iron ion.

In one embodiment, the metal ion is a p-block metal ion, especially aluminium.

In one embodiment, the metal ion is an actinide ion, especially a uranium ion and particularly the uranyl ion $(UO_2)^{2+}$.

The formed polymer composite may be regenerated after use. Typically, this is done by treating the mixture with a strong alkali, particularly an alkali metal hydroxide such as lithium hydroxide, sodium hydroxide or potassium hydroxide, optionally followed by and/or a dilute acid, such as dilute nitric acid, to remove beer stone/carbonates and neutralise the alkali. In contrast to the powder materials known in the prior art, forming the polymer composite into a rigid form means that less alkali is required to regenerate the material after use, thereby making regeneration safer and more environmentally friendly. The formed polymer composite material remains effective at removing haze-causing substances, such as polyphenols (especially tannoids) and/or proteins, even after multiple regenerations.

EXAMPLES

Apparatus and Methods

The studies described below used a Pfeuffer tannometer to measure tannoid levels: this device incorporates a sensitive turbidity meter to measure beer haze under precise test conditions. The amount of polyphenol tannoids present is measured by the addition of a polyvinyl pyrrolidone to the beer. The resulting titration curve has a peak which indicates the amount of PVP in mg/l added to have a PVP-tannoids balance for forming a maximum haze: the greater the amount of PVP required, the more tannoids there are present in the beer. A number of studies have indicated a close correlation between the prediction of haze with warm day tests (which measure the number of days that a beer can be stored with an acceptable level of haze following repeated cooling and heating cycles that emulate long-term storage) and tannoid levels.

Figure 1:
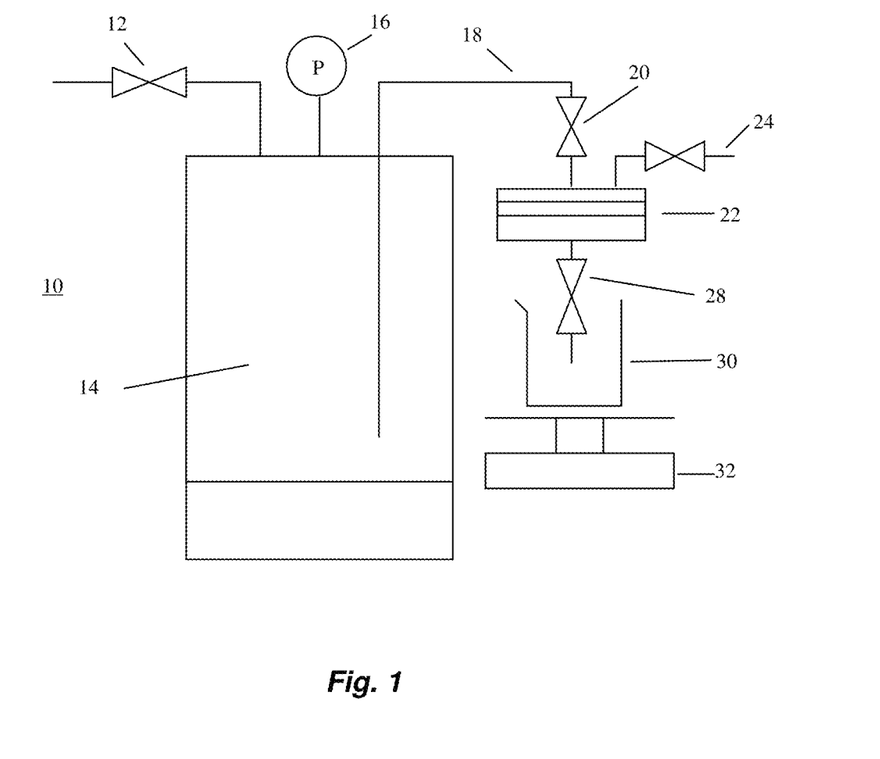
FIG. 1 illustrates apparatus for stabilising beer using the method of the present invention.

FIG. 1 illustrates generally apparatus 10 for stabilising beer using the material and method of the present invention. Compressed air flows from a compressed air supply (not shown) through valve 12 into pressure vessel 14 containing the beverage (or regeneration solution), the pressure being measured using pressure gauge 16. The beverage flows through line 18, its flow being controlled by valve 20. The beverage is filtered through the porous formed composite material 22 of the present invention, which in this embodiment comprises a series of discs held horizontally in a sealed holder, and is connected to outlet 24 via bleed valve 26. The stabilised beverage (or regeneration solution) passes through valve 28 into vessel 30. Closing valve 28 and opening valve 20 allows an increased in system pressure to prevent the beverage from degassing in the composite if required. Liquid flow is measured by weighing on balance 32.

The experiments were conducted at a flow rate of 50 ml/min through a 47 mm diameter disc of the material of the invention: the actual area available is reduced by the fittings to effect a 40 mm diameter disc (12.566 cm² area). The pressure was kept to a constant 0.5 bar and the flow reduced using a downstream valve to obtain the correct flow rate. The flow through the 10% PVPP/Vyon® composite was at a maximum of 37 ml/min at 0.6 bar.

The specific area flow rate in terms of hectolitres/hour/square metre ascertains whether flow is sufficient and comparable to existing processes. Horizontal leaf filters will typically have flow rates of 25 hl/hr/m². The flow rate through the 2% and 5% composite amounted to 24 hl/hr/m² at 50 ml/min and 18 hl/hr/m² for the 10% PVPP/Vyon® composite.

It should be noted that there was no seal or gasket used between discs where multiple discs where used. Bypassing of liquid between discs was therefore feasible.

The beer was obtained from Oakleaf Brewery in Gosport, United Kingdom. The 'Hole Hearted' beer was untreated and required filtration to remove the yeast. The beer was filtered using a Porvair Biofil™ II BT45 0.45 µm filter cartridge, washed and rinsed with aqueous sodium hydroxide and hot water between batches. The beer was directly filtered into a 'bag-in-a-box' with air squeezed from the headspace to reduce oxygen ingress and stored in a refrigerator. A low haze of less than 0.7 Nephelometric Turbidity Units (NTU) recorded in the tannometer indicated the beer was ready to use. Beer that had a high haze value at room temperature following extended storage was discarded. Prior to measurement the beer was degassed and again filtered with a 0.2 µm polyethersulfone (PES) membrane to remove any particles in the beer.

The results described below and illustrated in FIGS. 2 to 12 are based on sampling of the beer at specific volumes during the process and sampling of the beer from the total batch processed. All of the discs were pre-swollen overnight in order to prevent changes in the porosity during the stabilisation process.

Example 1

5% PVPP/Vyon® Composite

The composite comprised polyethylene (Vyon®, available from Porvair Filtration Group Ltd) co-sintered with polyvinylpolypyrrolidone (PVPP) (Polyclar® 10; available from ISP Corporation) that consists of particles of approximately 25 µm in diameter. The components were co-sintered at a temperature of 180±5° C. (oven temperature 245° C.) for 6 minutes.

The composite produced was robust. The mass of the disc was 3.097 g following removal of loose material from the surface of the disc. The disc was approximately 2.7 mm thick. Flow rates through the disc were as high as 170 ml/min (81 hl/hr/m²) at 100 mbar pressure difference, hence downstream flow had to be markedly reduced at 0.5 bar, in order to allow sufficient contact/residence time for the beer.

Figure 2:
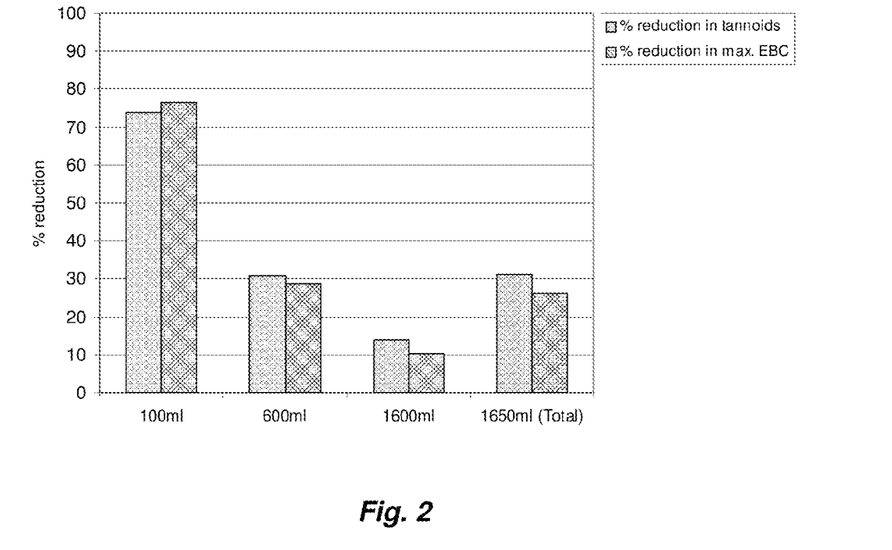
FIG. 2 illustrates the reduction in tannoids obtained by filtration through a 5% PVPP/Vyon® composite material of the present invention.
Figure 3:
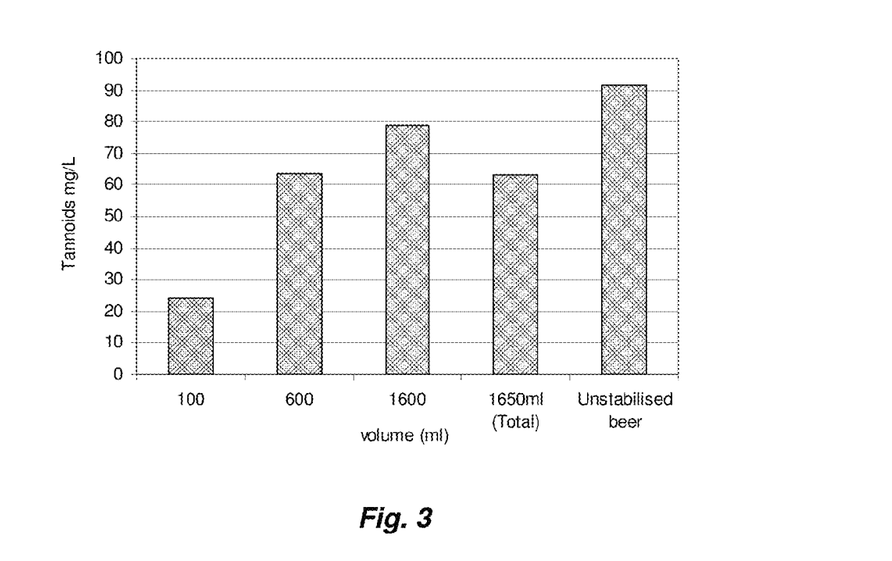
FIG. 3 illustrates the tannoids content in stabilised and unstabilised beer obtained by filtration through a 5% PVPP/Vyon® composite material of the present invention.

As shown in FIGS. 2 and 3, there is initially a marked reduction in the tannoid content. The material then becomes exhausted.

The quantity of PVPP available in the disc was approximately 0.1549 g, hence, the total PVPP dosage for the 1650 ml of stabilised beer approximates to 9.4 g PVPP/hl of beer. The rapid exhaustion of the composite suggested good contact between the beer and the PVPP within the matrix.

Example 2

10% PVPP/Vyon® Composite

The composite comprised polyethylene (Vyon®, available from Porvair Filtration Group Ltd) co-sintered with polyvinylpolypyrrolidone (PVPP) (Polyclar® 10; available from ISP Corporation) that consists of particles of approximately 25 µm in diameter. The components were co-sintered at a temperature of 180±5° C. (oven temperature 245° C.) for 6 minutes.

The composite was not robust; initial experiments to examine flow vs. pressure characteristics resulted in breakage of the composite at greater than 1 bar pressure difference. An intact disc was used for the stabilisation studies. Flow rates through the composite were 17.7 hl/hr/m² at 0.6 bar pressure in the pressure vessel. The mass of the disc was 3.2 g with a thickness of 2.5 mm.

Figure 4:
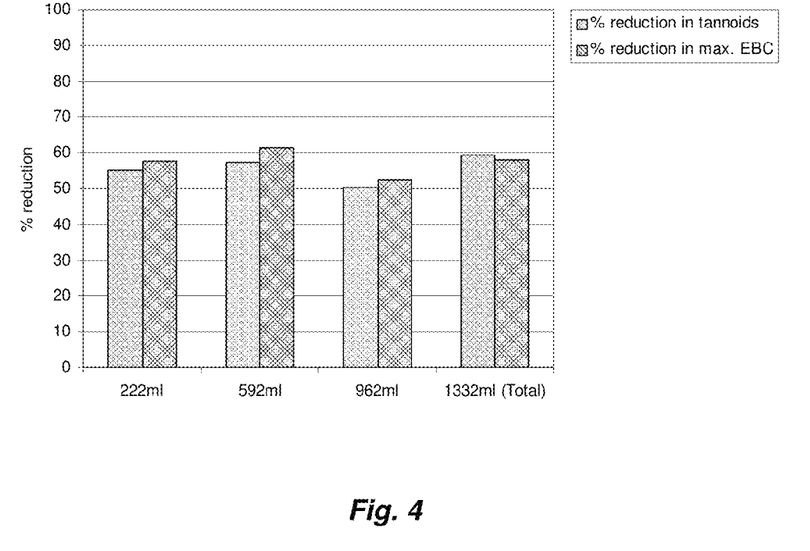
FIG. 4 illustrates the reduction in tannoids obtained by filtration through a 10% PVPP/Vyon® composite material of the present invention.
Figure 5:
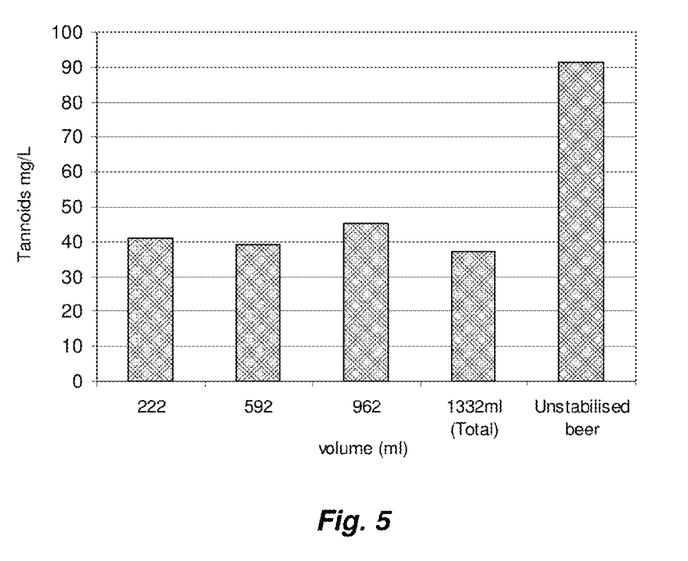
FIG. 5 illustrates the tannoids content in stabilised and unstabilised beer obtained by filtration through a 10% PVPP/Vyon® composite material of the present invention.

As shown in FIGS. 4 and 5, there is no significant reduction in the stabilisation throughout the experiment. The quantity of PVPP in the composite amounted to 0.32 g, hence the dosage for the total amount of beer treated was 24 g of PVPP/hl of beer.

The material showed damage when removed from its holder, allowing some bypassing of the beer to take place. The resultant mix of unstabilised and stabilised beer shows a reduced level of tannoids.

Based on the data described above and presented in FIGS. 2 to 5, it could be seen that the 5% PVPP/Vyon® composite appeared to be the most promising solution with respect to robustness and the quantity of beer stabilised. However, the contact time between the beer and the PVPP is very short: a single disc allows a contact time of just 4.07 s; a 3-high stack allows a contact time of 12.21 s. In batch systems, for a given quantity of PVPP, there is a strong correlation between contact time and level of stabilisation in the first 60-90 s.

Example 3

Experiments with Three 5% PVPP/Vyon® Discs Stacked Vertically

The experiment was performed with three composite discs stacked vertically in the holder. The total mass of the three composite discs was 9.06 g, containing 0.453 g of PVPP.

There was an opportunity for bypassing to occur, between the first and final disc. Flow rates were 413 ml/min at 0.5 bar pressure, however, as aforementioned some bypassing did occur, and therefore precise values could not be obtained.

Figure 6:
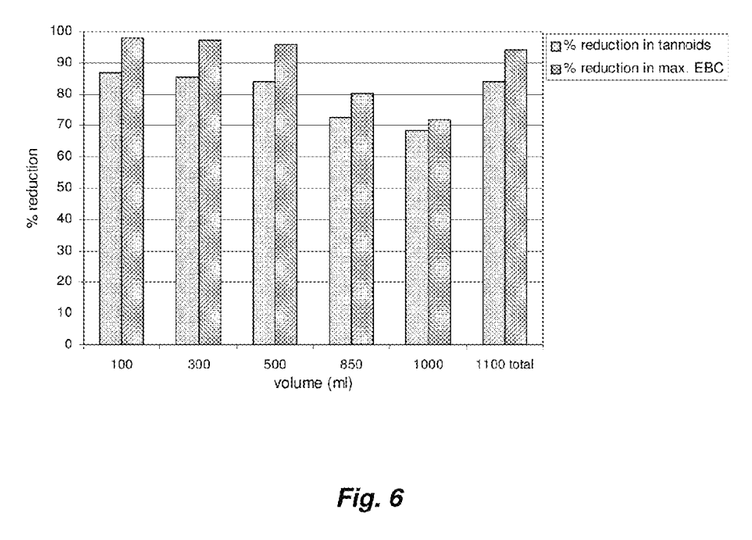
FIG. 6 illustrates the reduction in tannoids obtained by filtration through three stacked discs of a 5% PVPP/Vyon® composite material of the present invention.
Figure 7:
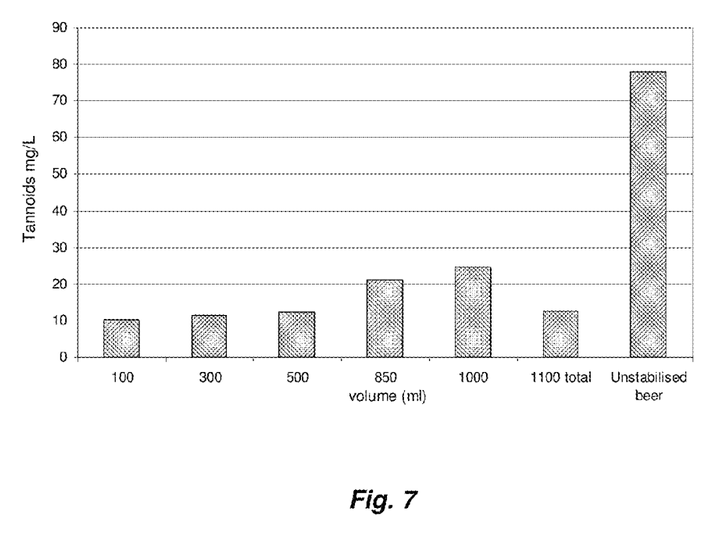
FIG. 7 illustrates the tannoids content in stabilised and unstabilised beer obtained by filtration through three stacked discs of a 5% PVPP/Vyon® composite material of the present invention.

As shown in FIGS. 6 and 7, there is a marked reduction in the tannoid content throughout the experiment. Low levels of tannoids were recorded from the samples: the dosage of PVPP for the total volume was 41.2 g of PVPP/hl.

Example 4

First Regeneration of the PVPP/Vyon® Composite

PVPP is regenerated in brewing with aqueous sodium hydroxide. The alkaline solution removes the tannoids as brown liquor following rinsing of the PVPP. Hot water is used to remove the sodium hydroxide solution.

The first regeneration is carried out as follows:
(a) hot water (70-80° C.);
(b) 1% (w/v) aqueous sodium hydroxide (60-65° C.); and
(c) hot water (70-80° C.).

Based on the data obtained with the fresh composite, a larger volume of beer was treated. The dosage was 20.1 g PVPP/hl of beer.

Figure 8:
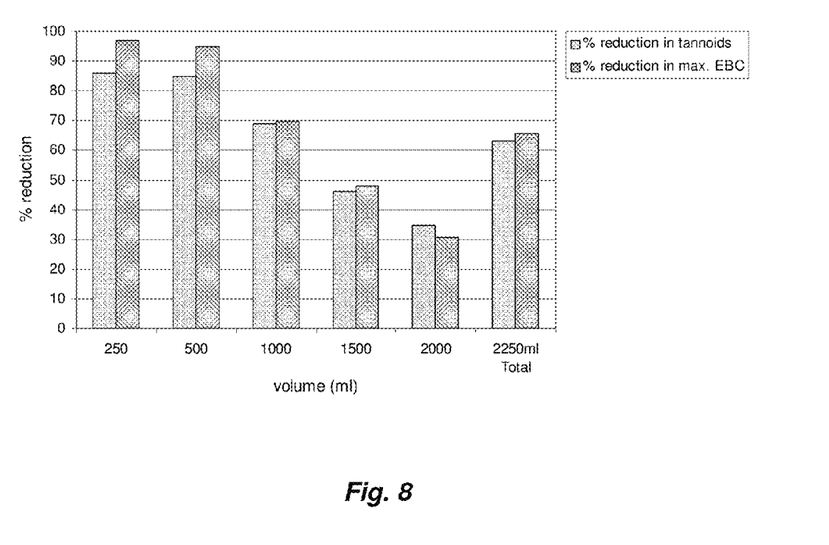
FIG. 8 illustrates the reduction in tannoids obtained by filtration through three stacked discs of a regenerated 5% PVPP/Vyon® composite material of the present invention.
Figure 9:
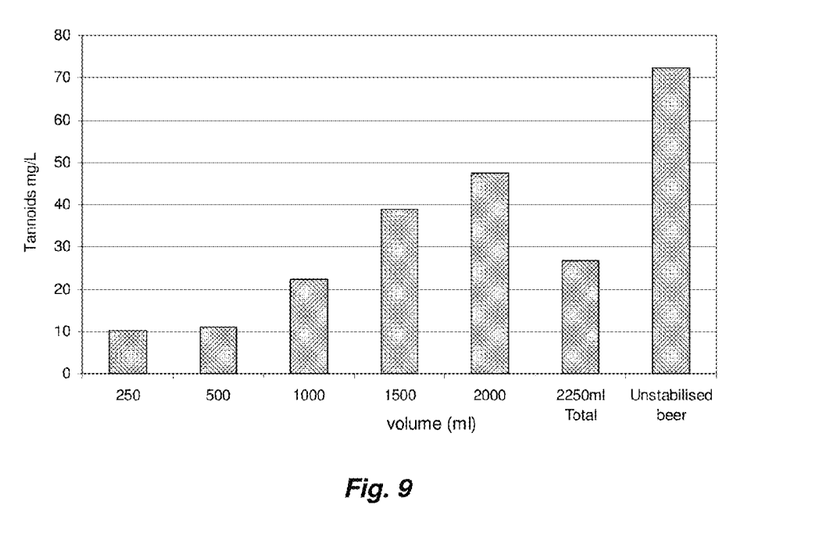
FIG. 9 illustrates the tannoids content in stabilised and unstabilised beer obtained by filtration through three stacked discs of a regenerated 5% PVPP/Vyon® composite material of the present invention.

As shown in FIGS. 8 and 9, the regenerated PVPP showed a strong stabilisation effect. It is important to note that a larger volume of beer was treated: the reduction in the tannoid levels in the fresh and regenerated PVPP are near identical for the same volume e.g. 70% at 1000 ml.

Example 5

Second Regeneration of the PVPP/Vyon® Composite

The initial regeneration although effective was thought to have been hampered by 'beer stone' carbonates. These are usually removed by nitric acid during the regeneration of PVPP.

The second regeneration is carried out as follows:
(a) hot water (70-80° C.);
(b) 1% (w/v) aqueous sodium hydroxide (60-65° C.); and
(c) hot water (70-80° C.);
(d) deionised water (room temperature)
(e) 0.5% (v/v) nitric acid;
(f) deionised water (room temperature)

Figure 10:
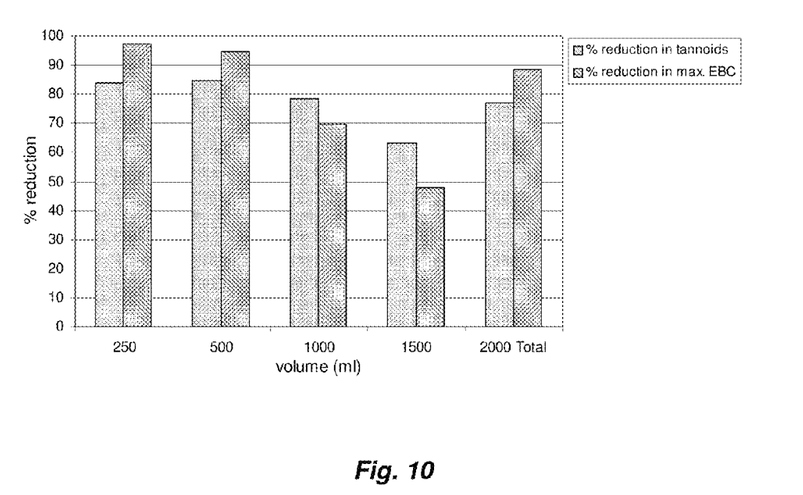
FIG. 10 illustrates the reduction in tannoids obtained by filtration through three stacked discs of a twice regenerated 5% PVPP/Vyon® composite material of the present invention.
Figure 11:
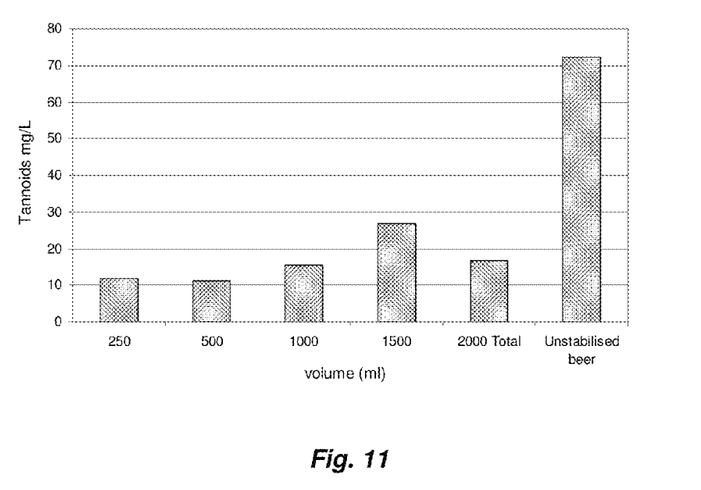
FIG. 11 illustrates the tannoids content in stabilised and unstabilised beer obtained by filtration through three stacked discs of a twice regenerated 5% PVPP/Vyon® composite material of the present invention.

As shown in FIGS. 10 and 11, there is a marked reduction in the tannoid levels with no evidence of a loss in efficacy. The effective dosage of PVPP for the total volume of beer is 22.7 g PVPP/hl. The tannoid levels are low for the beer and suggest a high degree of stability is attainable.

Figure 12:
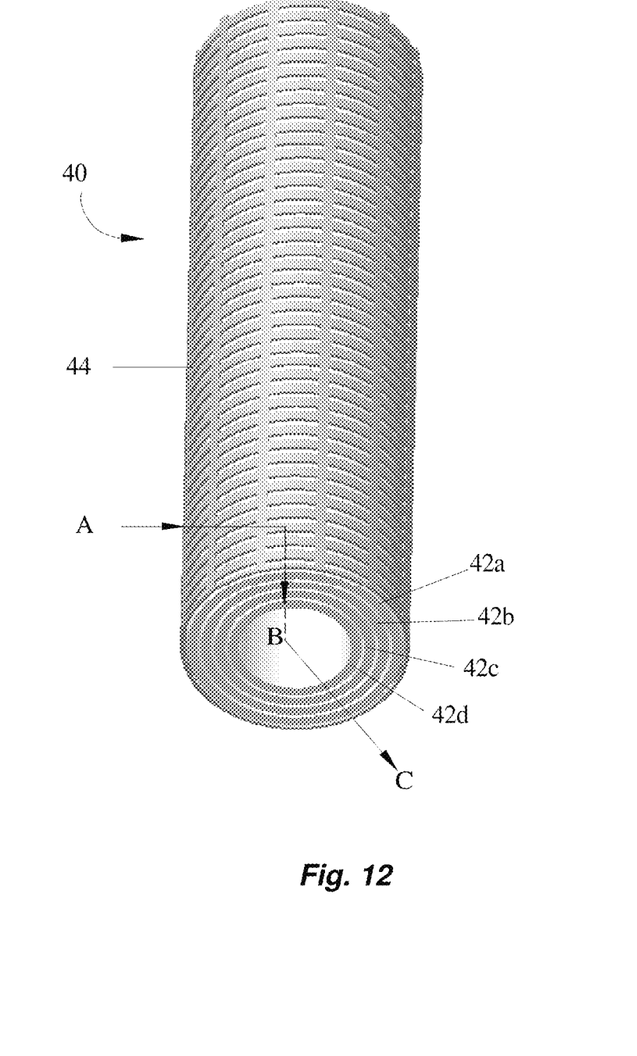
FIG. 12 illustrates a filtration apparatus according to one embodiment of the present invention, consisting of concentric cylinders of filtration material surrounded by an outer cage.

FIG. 12 illustrates generally at 40 a solid phase extraction apparatus according to one embodiment of the present invention. The apparatus is formed from concentric cylinders 42a, 42b, 42c, 42d of the porous composite material of the present invention. These cylinders are surrounded by an outer cage 44 of standard material. An inner core 46 may be hollow or may be fitted with an adaptor or end-cap as is known to those skilled in the art. In use, the beverage is introduced to the outside of the cylinders, and may flow along the line defined by A-B-C through the cylinders 42a, 42b, 42c, 42d towards the inner core 46. The stabilised beverage flows out of the inner core 46 into a suitable receptacle.

Figure 13:
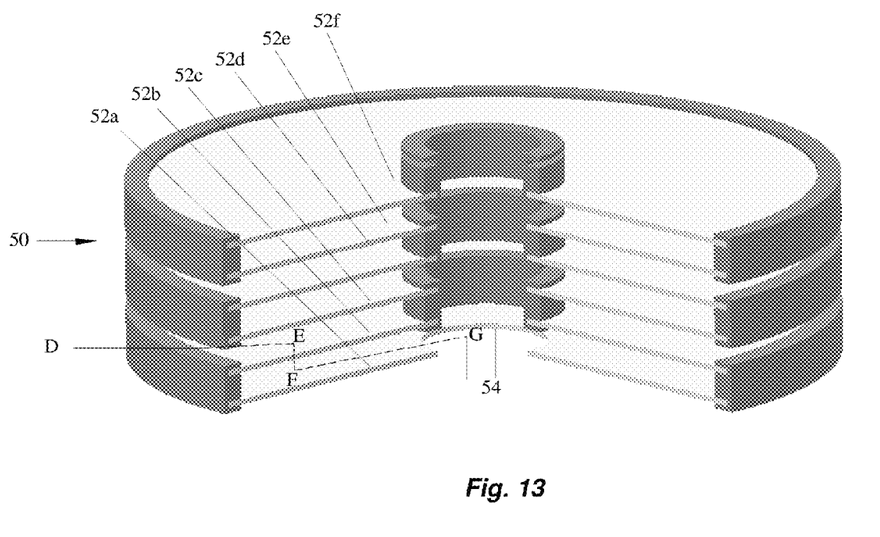
FIG. 13 illustrates a filtration apparatus according to a different embodiment of the present invention, consisting of stacked flat sheets of filtration material.

FIG. 13 illustrates generally at 50 a solid phase extraction apparatus according to another embodiment of the present invention. The porous composite material of the present invention is formed into flat sheets 52a, 52b, 52c, 52d, 52e, 52f which are stacked one on top of another and welded together to form a lenticular type construction. An inner core 54 may be hollow or may be fitted with an adaptor or end-cap as is known to those skilled in the art. In use, the beverage is introduced to the outside of the sheets, and may flow along the line defined by D-E-F-G through the cylinders 52b, 52a towards the inner core 54. The stabilised beverage flows out of the inner core 54 into a suitable receptacle.

The process of the present invention is resistant to changes in the pressure drop and flow. This is a key drawback of the prior art PVPP in horizontal leaf and candle filters; any change in flow or pressure can result in a disturbance of the cake and cause a loss of PVPP and downstream contamination of the beverage. Excessive pressures across a filter cake cause it to become less porous and block; hysteresis characteristics prevent a restoration of flow. In addition, a loss of system pressure can cause the beer to degas inside the cake. The composite material of the present invention is resistant to sudden changes in pressure, the intrusion of gas and high pressures. The composite, by fixing an adsorbent evenly within a matrix achieves a much more uniform and controlled distribution of the PVPP as compared to dosing the material onto a horizontal filter plate or candle.

As shown by the results presented above and in the Figures, the composite material of the present invention may be regenerated easily and safely. The composite is easily regenerated in situ. The safety implications are minimised and only the equipment to dose the regeneration solutions is necessary. It is estimated that little or no loss of PVPP would occur even after 10 or more regenerations. In addition, the robustness of the composite material is totally unaffected by the two regenerations tried.

All publications mentioned in the above specification are herein incorporated by reference. Various modifications and variations of the described methods and system of the present invention will be apparent to those skilled in the art without departing from the scope and spirit of the present invention. Although the present invention has been described in connection with specific preferred embodiments, it should be understood that the invention as claimed should not be unduly limited to such specific embodiments. Indeed, various modifications of the described modes for carrying out the invention which are obvious to those skilled in chemistry and materials science or related fields are intended to be within the scope of the following claims.

The invention claimed is:

1. A porous formed composite material comprising:
   (i) a polymer selected from polyethylene, polypropylene, and a mixture thereof, and:
   (ii) an insoluble sorbent material selected from the group consisting of:
       (a) a cross-linked vinyl lactam homopolymer or copolymer, said vinyl lactam homopolymer or copolymer being optionally mixed with silica gel; and
       (b) polyvinyl lactam-modified silica gel;
   the formation process causing the polymer (i) and insoluble sorbent material (ii) to be formed into a rigid unitary body such that the insoluble sorbent material is immobilised into the structure of the rigid unitary body.

2. A porous formed composite material according to claim 1, containing 2% to 38% by weight of the insoluble sorbent material (ii).

3. A porous formed composite material according to claim 1, containing 3% to 25% by weight of the insoluble sorbent material (ii).

4. A porous formed composite material according to claim 1, wherein the insoluble sorbent material (ii) is a cross-linked homopolymer or copolymer of vinyl pyrrolidone.

5. A porous formed composite material according to claim 4, wherein the insoluble sorbent material (ii) comprises polyvinyl polypyrrolidone (PVPP).

6. A porous formed composite material according to claim 5, wherein the degree of cross-linking of the PVPP is such that between 60% and 100% of the PVPP is insoluble.

7. A porous formed composite material according to claim 5, containing 2.5% to 35% by weight of polyvinyl polypyrrolidone.

8. A porous formed composite material according to claim 1, wherein the insoluble sorbent material (ii) comprises polyvinyl pyrrolidone-modified silica gel.

9. A porous formed composite material according to claim 8, containing 2.5% to 35% by weight of the polyvinyl pyrrolidone-modified silica gel.

10. A porous formed composite material according to claim 1, wherein the insoluble sorbent material (ii) comprises a mixture of silica gel and polyvinylpolypyrrolidone.

11. A porous formed composite material according to claim 10, wherein the insoluble sorbent material (ii) contains from 0.25% to 31.5% by weight of silica gel and 31.5% to 0.2% by weight of polyvinyl polypyrrolidone.

12. A porous formed composite material of claim 1, wherein the material has a shape selected from a frit, a sheet, a disc or a roll.

13. A solid phase extraction apparatus comprising the porous formed composite material of claim 1.

14. A method of manufacturing the porous formed composite material, the method comprising mixing:
   (i) a polymer selected from polyethylene, polypropylene, and or a mixture thereof, and:
   (ii) an insoluble sorbent material selected from the group consisting of:
       (a) a cross-linked vinyl lactam homopolymer or copolymer, said vinyl lactam homopolymer or copolymer being optionally mixed with silica gel; and
       (b) polyvinyl lactam-modified silica gel;
   to form a rigid unitary body wherein the insoluble sorbent material is immobilized into the rigid unitary body.

15. A method of removing a substance selected from a polyphenol, a polypeptide and a protein from a beverage, the method comprising passing the beverage through a porous formed composite material comprising:
   (i) a polymer selected from polyethylene, polypropylene, and a mixture thereof, said polymer having immobilised therein:
   (ii) an insoluble sorbent material selected from the group consisting of:
       (a) a cross-linked vinyl lactam homopolymer or copolymer, said vinyl lactam homopolymer or copolymer being optionally mixed with silica gel;
       (b) polyvinyl lactam-modified silica gel; and
       (c) silica gel.

16. A method according to claim 15, wherein the substance removed from the beverage is a polyphenol.

17. A method according to claim 16, wherein the polyphenol removed from the beverage is a tannoid and/or a flavonoid.

18. A method of preventing the formation of haze in a beverage, the method comprising passing the beverage through a porous formed composite material comprising:
   (i) a polymer selected from polyethylene, polypropylene, and a mixture thereof, said polymer having immobilised therein
   (ii) an insoluble sorbent material selected from the group consisting of:
       (a) a cross-linked vinyl lactam homopolymer or copolymer, said homopolymer or copolymer being optionally mixed with silica gel;
       (b) polyvinyl lactam-modified silica gel; and
       (c) silica gel.

19. A method of removing a metal ion from a solution, the method comprising passing the solution through a porous formed composite material comprising:
   (i) a polymer selected from polyethylene, polypropylene, and a mixture thereof, said polymer having immobilised therein:
   (ii) an insoluble sorbent material selected from the group consisting of:
       (a) a cross-linked vinyl lactam homopolymer or copolymer, said vinyl lactam homopolymer or copolymer being optionally mixed with silica gel;
       (b) polyvinyl lactam-modified silica gel; and
       (c) silica gel.

20. A method according to claim 19, wherein the metal ion is an iron ion.

* * * * *